C. W. Reed.
Horse Hay Fork.
Nº 72540          Patented Dec. 24, 1867
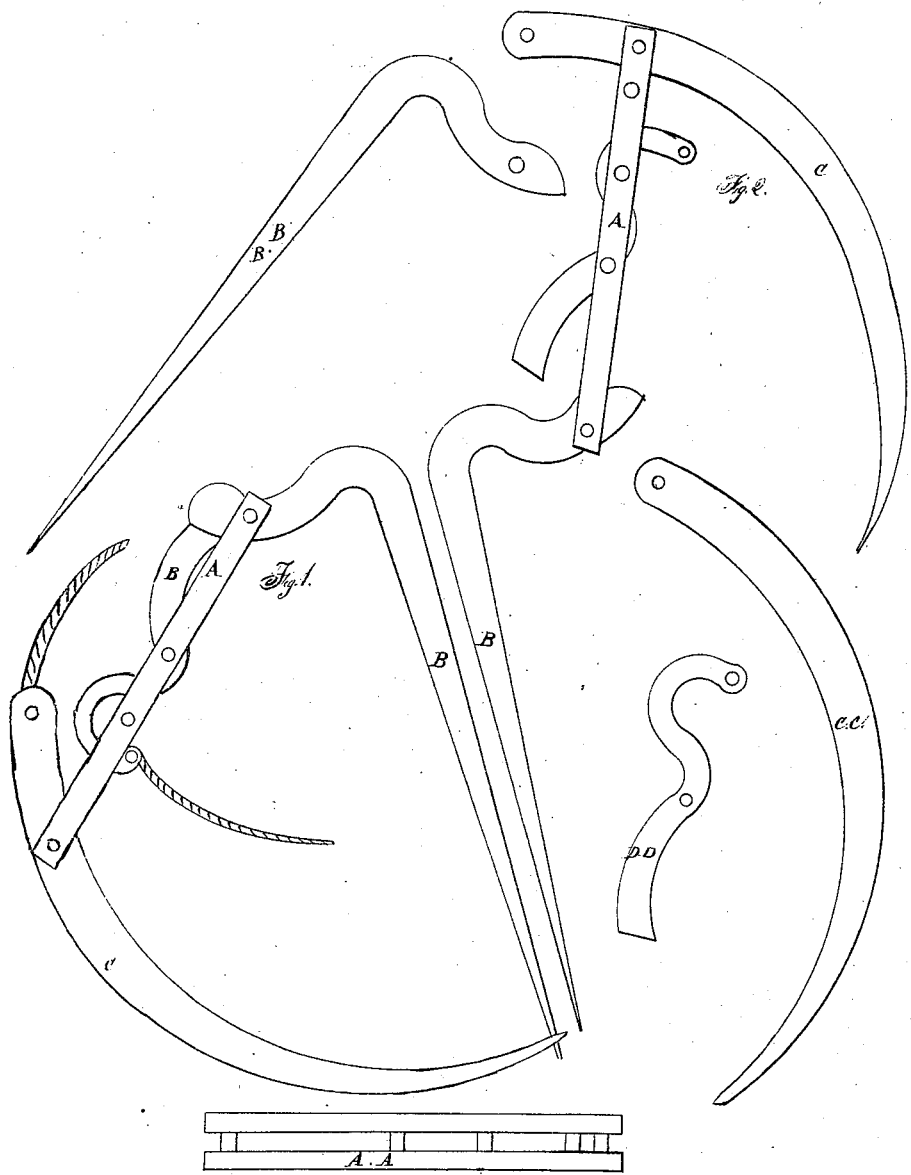

United States Patent Office.

CULLIN W. REED, OF CHAGRIN FALLS, OHIO.

Letters Patent No. 72,540, dated December 24, 1867.

---

IMPROVEMENT IN HORSE HAY-FORKS.

---

*The Schedule referred to in these Letters Patent and making part of the same.*

---

TO ALL WHOM IT MAY CONCERN:

Be it known that I, CULLIN W. REED, of Chagrin Falls, in the county of Cuyahoga, and State of Ohio, have invented a new and improved Mode of Unloading, Loading, or Removing Hay; and I do hereby declare that the following is a full and exact description thereof, reference being had to the accompanying drawings, and to the letters of reference marked thereon.

The nature of my invention consists in an instrument for loading, unloading, or removing hay, which is done more easily, and is more simple and durable in its construction, and is attended with much less expense than any other instrument now in use for the above-named purpose, and is described as follows, by letters A, B, C, and D:

The head A is made of two bars of iron or steel, one and one-quarter inch wide and one-half inch thick, being sixteen inches long. B and C are tines, in form as seen in drawing, fastened between the ends of the bars A by a rivet. D is a latch, working between bars A in such a manner as to hold the tine B firm, when set in the hay, as seen in the drawing No. 1; also, when in position to set in the hay, as seen in same drawing, by dotted tine and latch. E is the draw-rope for raising the hay. F is the latch-rope, which is to be drawn to let off the hay, which, when drawn, raises latch above the upper end of tine B, and lets it, together with tine C, drop to a perpendicular position, as seen in drawing No. 2.

To load the fork, tine B is let back against latch, as seen in drawing No. 1, by dotted tine and latch, which holds it firm to push into hay. The tine C is brought down and pressed into the hay until head A comes to a horizontal position, in which position the latch drops behind the upper end of tine B, as seen in drawing No. 1.

What I claim as my invention, is—

The tines B and C, bars A, latch D, and cords E and F, when the same are combined and arranged substantially as described, and for the purpose set forth.

CULLIN W. REED.

Witnesses:
 ELEAZER GOODWIN,
 E. H. EGGLESTON.